(12) United States Patent
Schmitz et al.

(10) Patent No.: US 7,762,737 B2
(45) Date of Patent: Jul. 27, 2010

(54) SYSTEM AND METHOD FOR STOWAGE COMPARTMENT PIVOT ASSEMBLY

(75) Inventors: Chad D. Schmitz, Arlington, WA (US); Michael S. Haynes, Seattle, WA (US); Nelson J. Jeyarajah, Lynnwood, WA (US); Michael J. Malkinson, Lynnwood, WA (US); Christopher S. Pugh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 11/558,282

(22) Filed: Nov. 9, 2006

(65) Prior Publication Data

US 2008/0112754 A1 May 15, 2008

(51) Int. Cl.
*B64C 1/00* (2006.01)
(52) U.S. Cl. .................................. 403/163; 244/118.1
(58) Field of Classification Search ................ 403/119, 403/154, 161–163, 165, 263, 350; 224/483
See application file for complete search history.

(56) References Cited

U.S. PATENT DOCUMENTS

| | | | |
|---|---|---|---|
| 620,551 A | 2/1899 | Porter | |
| 750,376 A | 1/1904 | Lampitt | |
| 2,445,399 A | 7/1948 | Johnson | |
| 3,656,801 A | 4/1972 | Doutt et al. | |
| 4,597,599 A | 7/1986 | Bisbing | |
| 4,718,586 A * | 1/1988 | Hagino | 224/666 |
| 4,835,852 A * | 6/1989 | Asplund et al. | 29/464 |
| 4,929,116 A * | 5/1990 | Mahl | 403/263 |
| 5,026,016 A * | 6/1991 | Lisowski | 248/314 |
| 5,045,656 A | 9/1991 | Kojima | |
| 5,054,170 A * | 10/1991 | Otrusina | 24/580.11 |
| 5,398,783 A | 3/1995 | Jacoby | |
| 5,441,218 A | 8/1995 | Mueller et al. | |
| 5,456,529 A | 10/1995 | Cheung | |
| 5,597,102 A * | 1/1997 | Saarikko et al. | 224/197 |
| 5,620,120 A * | 4/1997 | Tien | 224/199 |
| 5,788,224 A * | 8/1998 | Platt | 256/66 |
| 5,850,954 A * | 12/1998 | Dong-Joo | 224/197 |
| 5,850,996 A * | 12/1998 | Liang | 248/221.11 |

(Continued)

FOREIGN PATENT DOCUMENTS

EP 0 737 147 12/1999

OTHER PUBLICATIONS

Simmons, G. and Warden, L. "Overhead Storage Bins" printed from Internet website: http://www.boeing.com/commercial/aeromagazine/aero_15/overhead_..., Nov. 23, 2004.

*Primary Examiner*—Daniel P Stodola
*Assistant Examiner*—Joshua T Kennedy
(74) *Attorney, Agent, or Firm*—Harness, Dickey & Pierce, P.L.C.

(57) ABSTRACT

A pivot system for a stowage compartment system for a mobile platform (for example, commercial aircraft) is provided. The pivot system includes a first fitting that defines a raceway and an engagement feature and a second fitting. The second fitting includes a hub for engagement with the raceway and a mating engagement feature to secure the first fitting within the second fitting. The second fitting also includes a guide that directs the first fitting into the second fitting to couple the first fitting to the second fitting.

10 Claims, 8 Drawing Sheets

U.S. PATENT DOCUMENTS

| | | | |
|---|---|---|---|
| 5,906,031 A * | 5/1999 | Jensen | 24/3.12 |
| 5,988,724 A | 11/1999 | Wolda | |
| 6,059,156 A * | 5/2000 | Lehtinen | 224/197 |
| 6,260,213 B1 * | 7/2001 | Eom et al. | 2/424 |
| 6,318,671 B1 | 11/2001 | Schumacher et al. | |
| 6,527,325 B2 | 3/2003 | Steingrebe et al. | |
| 6,598,829 B2 | 7/2003 | Kamstra | |
| 6,622,313 B1 * | 9/2003 | Choi et al. | 2/424 |
| 6,685,067 B2 * | 2/2004 | French | 224/198 |
| 6,796,592 B1 | 9/2004 | Austin | |
| 6,899,299 B2 | 5/2005 | Ritts | |
| 6,955,280 B2 * | 10/2005 | Saitoh et al. | 224/269 |
| 6,981,623 B2 * | 1/2006 | Iitsuka | 224/197 |
| 7,128,295 B2 * | 10/2006 | Scown | 244/118.1 |
| 7,225,471 B2 * | 6/2007 | Sutter et al. | 2/6.4 |
| 7,241,071 B2 * | 7/2007 | Carraher et al. | 403/164 |
| 2006/0097034 A1 | 5/2006 | Rudduck et al. | |

* cited by examiner

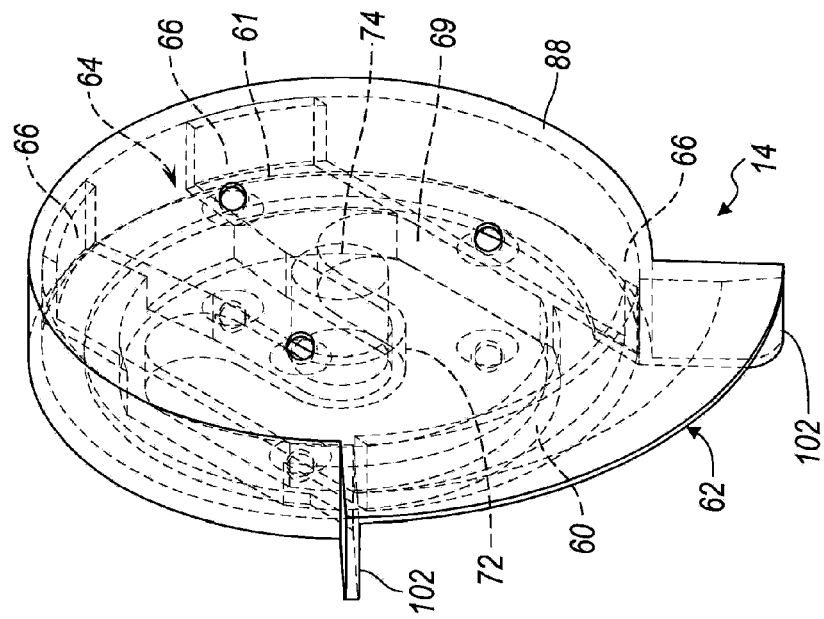
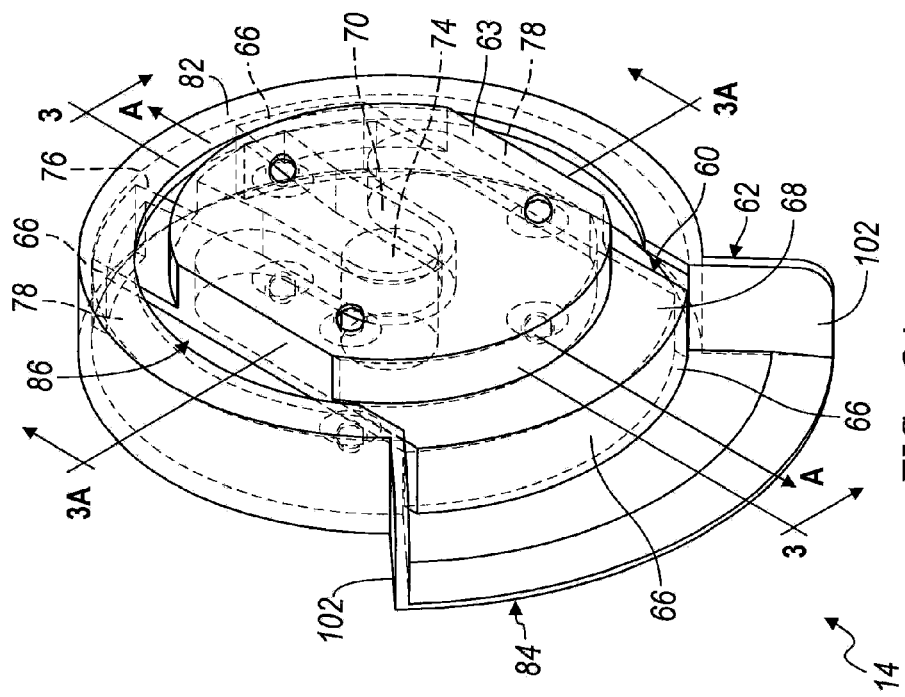

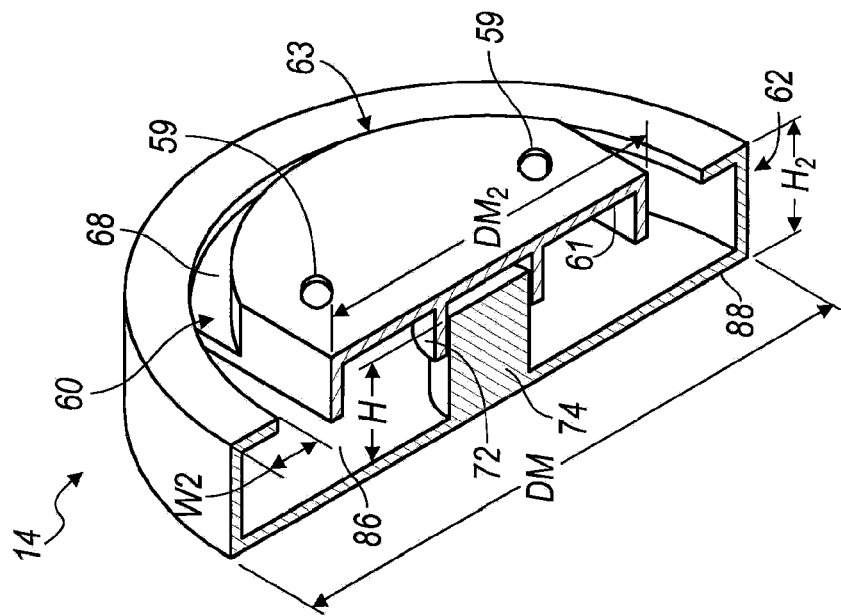
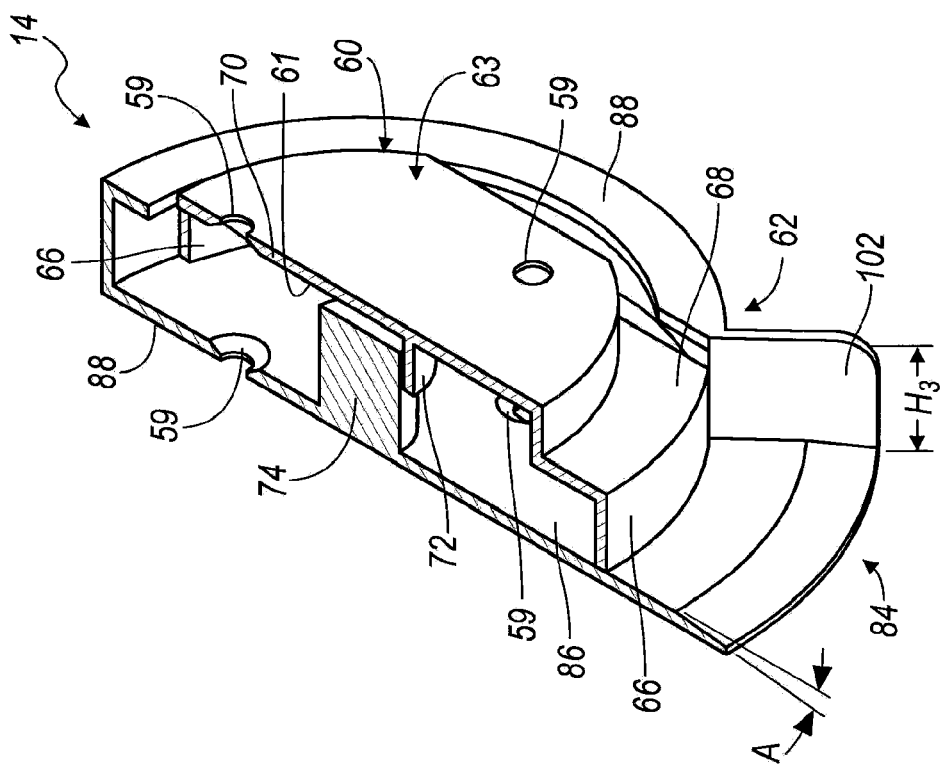
FIG. 3A
FIG. 3

US 7,762,737 B2

SYSTEM AND METHOD FOR STOWAGE COMPARTMENT PIVOT ASSEMBLY

CROSS-REFERENCE TO RELATED APPLICATIONS

The present application is related in general subject matter to pending U.S. patent application Ser. No. 11/510,821, entitled "System and Method for Pivot for Stowage Compartments or Rotating Items," hereby incorporated by reference in its entirety into the present application. Additionally, the present application is related in general subject matter to pending commonly assigned U.S. patent application Ser. No. 10/905,502, filed on Jan. 7, 2005, entitled "Pivot Mechanism for Quick Installation of Stowage Bins or Rotating Items," hereby incorporated by reference in its entirety into the present application.

FIELD

The present disclosure relates generally to rotatable stowage compartments, and more particularly to a system and method for a pivot assembly for use with a stowage compartment.

BACKGROUND

The statements in this section merely provide background information related to the present disclosure and may not constitute prior art.

Many mobile platforms (such as trains, ships, aircraft and automobiles) employ stowage compartments in a cabin of the mobile platform to enable stowage of passenger items, such as carry-on baggage. With regard to commercial passenger aircraft, increased baggage stowage demands have required the stowage compartments to increase in size and load capacity. In addition, there is a drive to increase passengers "personal space" (i.e., headroom) in the cabin of the aircraft. The desire for increased "personal space" in the cabin has resulted in higher ceilings and the placement of storage compartments higher in the cabins.

The placement of stowage compartments at a higher position in the cabin can necessitate the use of additional equipment to install the compartments at the necessary height. In addition, in certain cases it may be desirable to remove and replace the stowage compartments. Accordingly, it would be desirable to have a stowage compartment design that provides for easy removal and replacement of the stowage compartments while still allowing for easy access to the stowage compartments by passengers when the stowage compartments are installed in a mobile platform.

SUMMARY

A system and method for a pivot system for a stowage compartment system for a mobile platform (for example, commercial aircraft) is provided. In one embodiment the pivot system includes a first fitting that defines a raceway and an engagement feature and a second fitting. The second fitting includes a hub defined in the second fitting for engagement with the raceway and a mating engagement feature to secure the first fitting within the second fitting. The second fitting also includes a guide that directs the first fitting into the second fitting to couple the first fitting to the second fitting.

In one embodiment, a mobile platform is provided. The mobile platform includes a interior overhead structure and at least one compartment rotatably coupled to the interior overhead structure. The compartment is rotatable into an opened position and a closed position. The mobile platform further includes a pivot system coupled to the interior overhead structure and the compartment to enable the compartment to rotate into the opened position and the closed position. The pivot system comprises a first fitting that defines a raceway and a second fitting that defines a hub and a guide. The hub of the second fitting is for engagement with the raceway and the guide directs the first fitting into the second fitting to couple the first fitting to the second fitting.

The present teachings also provide a method for coupling a first structure to a second structure where the second structure is movable relative to the first structure. The method includes providing a first fitting defining a raceway and a second fitting defining a hub and coupling the first fitting to the second structure. The method also includes coupling the second fitting to the first structure and guiding the raceway of the first fitting into engagement with the hub of the second fitting with at least one guide defined on the second fitting.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 2A is a perspective top view of the pivot system for use with the stowage compartments of FIG. 1;

FIG. 2B is a perspective bottom view of the pivot system for use with the stowage compartments of FIG. 1;

FIG. 3 is a cross-sectional view of the pivot system of FIG. 2A taken along line 3-3 of FIG. 2A;

FIG. 3A is a cross-sectional view of the pivot system of FIG. 2A taken along line 3A-3A of FIG. 2A;

DETAILED DESCRIPTION

The following description is merely exemplary in nature and is not intended to limit the present disclosure, application, or uses. Although the following description is related generally to a pivot system for use with a compartment for a mobile platform (such as an aircraft, ship, spacecraft, train or land-based motor vehicle), it will be understood that the pivot system, as described and claimed herein, can be used with any appropriate application where it would be useful to rotate a device within a housing. Therefore, it will be understood that the following discussion is not intended to limit the scope of the appended claims to only stowage compartments or stowage compartments on mobile platforms, since the pivot system could just as readily be employed in buildings or other fixed structures.

Figure 1:
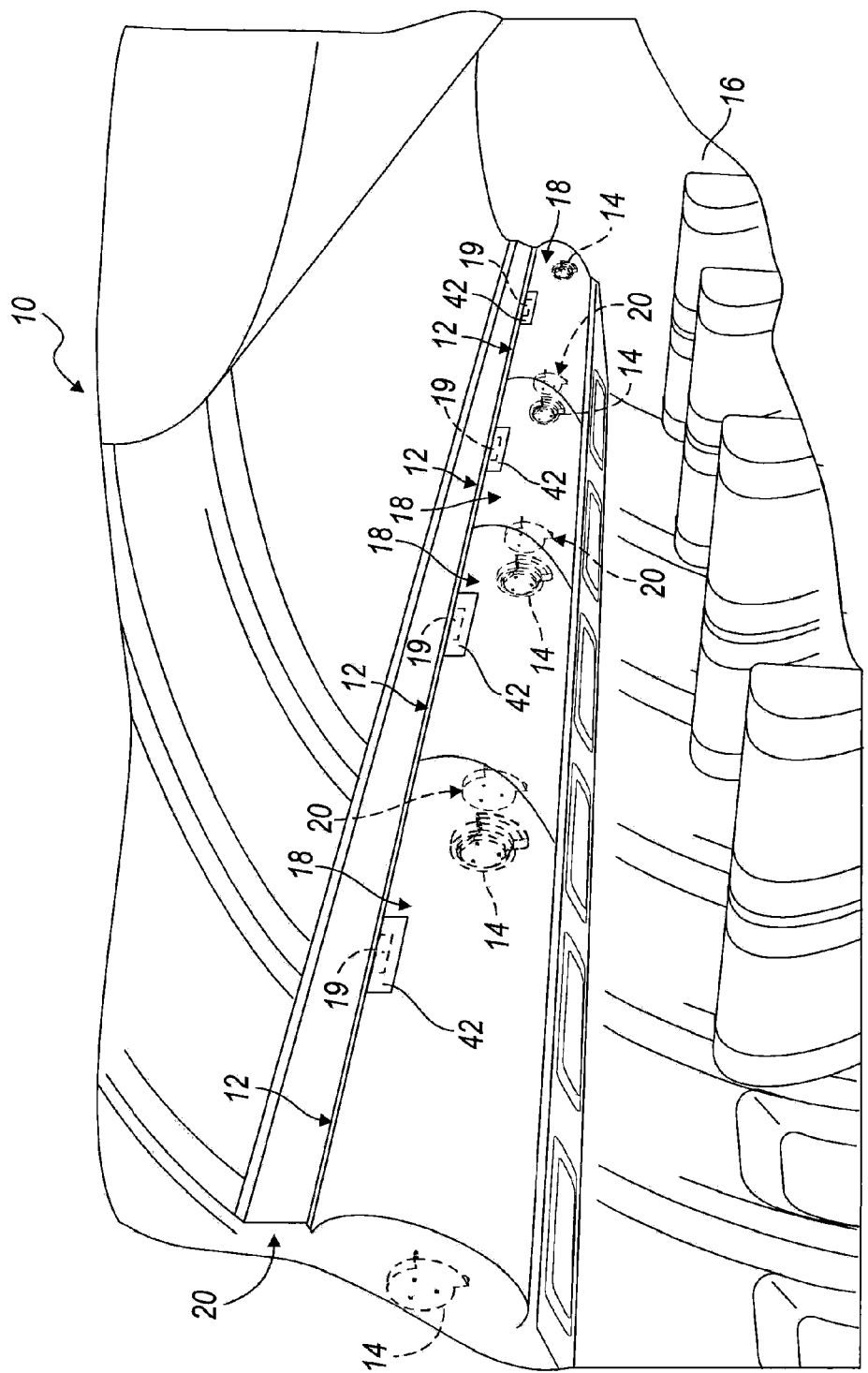
FIG. 1 is a perspective view of a portion of a mobile platform incorporating the system and method for a stowage compartment pivot system illustrating a plurality of stowage compartments with pivot assemblies (in phantom) according to the present disclosure.

With reference to FIG. 1, an exemplary mobile platform 10 including a compartment system 12 is shown. The compartment system 12 employs a pivot system 14 to enable the compartment system 12 to rotate into an opened and a closed position. The mobile platform 10, in this example, is a passenger aircraft including a cabin 16. It should be noted that the mobile platform 10 is illustrated as including a single row of compartment systems 12, the mobile platform 10 could include any number of compartment systems 12. In addition, it will be noted that although the compartment system 12 is illustrated and described herein as being a manually operated compartment system 12, it will be understood that the pivot system 14 can be used in conjunction with a power-assisted compartment system, if desired (not shown). The compartment system 12 can include at least one or a plurality of compartment(s) 18 that are releasably coupled to an interior overhead structure or a housing 20 via a latch system 19, and rotatably coupled to the housing 20 by the pivot systems 14.

As the compartment 18 and housing 20 are exemplary structures for use with the pivot system 14, the compartment 18 and housing 20 will not be discussed in great detail herein. In addition, as the latch system 19 could be any suitable mechanism capable of securing the compartment 18 in the closed position, the latch system 19 will not be discussed in great detail herein. Further detail regarding the compartment 18, housing 20 and latch system 19 can be found in U.S. patent application Ser. No. 11/510,821 entitled "System and Method For Pivot For Stowage Compartments Or Rotating Items" previously incorporated herein by reference and U.S. patent application Ser. No. 11/510,779 entitled "System and Method For A Power-Assisted Compartment" hereby incorporated by reference in its entirety.

Figure 2:
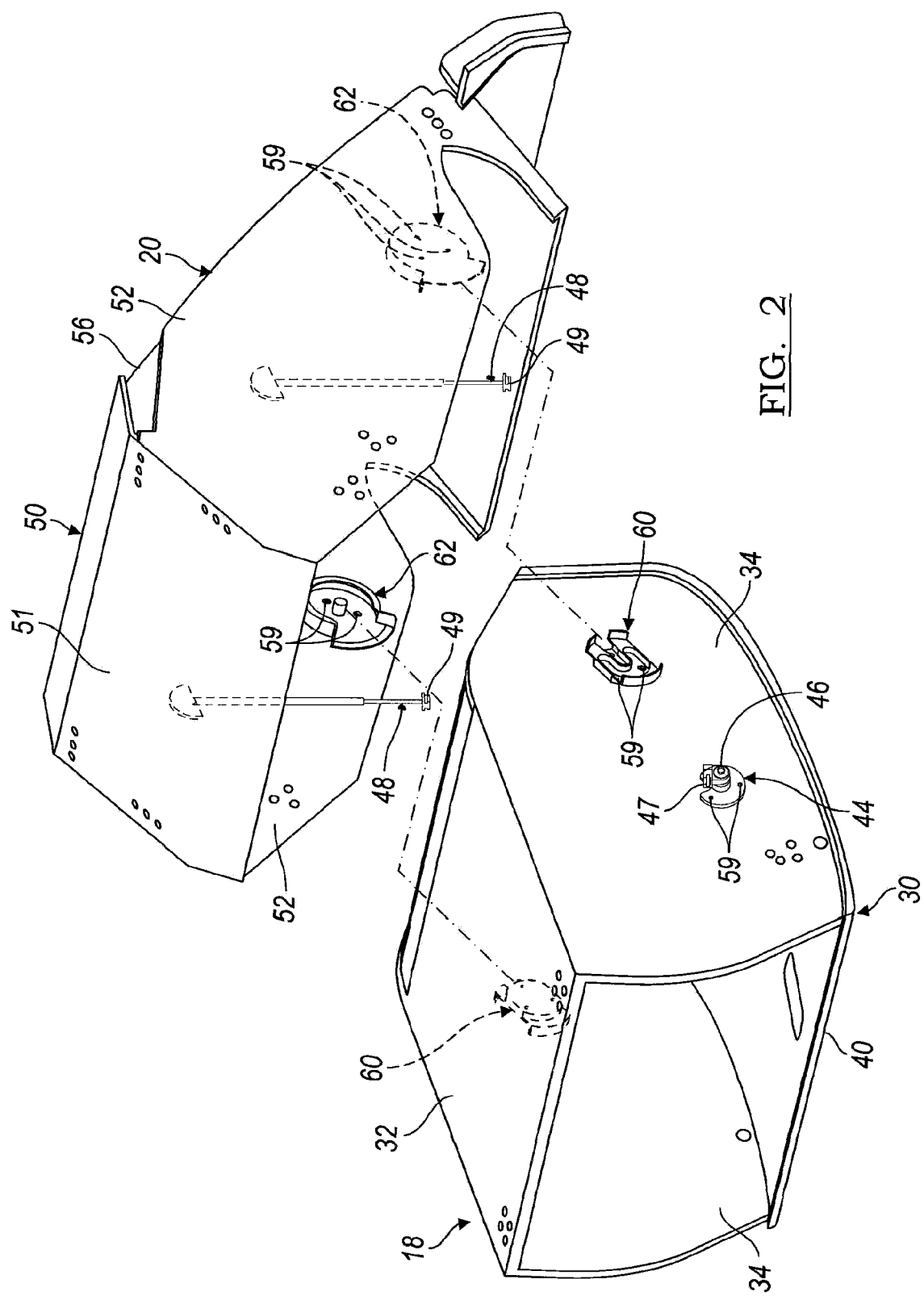
FIG. 2 is a perspective view of an exemplary stowage compartment including the pivot system in a first position prior to the assembly of the pivot system.

Briefly, however, with reference to FIG. 2, each of the compartments 18 includes a cabin forward panel 30, a rear panel 32 and sidewalls 34 disposed between the cabin forward panel 30 and the rear panel 32. The compartments 18 form a structure for receiving passenger items through an aperture defined between the cabin forward panel 30 and the rear panel 32 (FIG. 2). With continuing reference to FIG. 2, the cabin forward panel 30 and rear panel 32 are generally mounted to each other and the sidewalls 34 through a plurality of mechanical fasteners, such as screws or rivets (not shown); however, any suitable technique could be used to form the compartments 18, such as molding, welding and/or adhesives.

The cabin forward panel 30 includes a front surface 40 that can include at least one feature, such as a handle 42, to enable a user to disengage the latch system 19 (FIG. 1). Referring back to FIG. 2, the sidewalls 34 include at least one of a plurality of mounting brackets 44 that couples the compartment 18 to the housing 20 via at least one or a plurality of dampers 48. The mounting brackets 44 include a projection 46. The projection 46 can provide an attachment point for the damper 48. The projection 46 can include a clip 47 to engage an end 49 of the damper 48, however any other mechanism could be used to secure the damper 48 to the compartment 18.

The sidewalls 34 are configured to mate with the cabin forward panel 30 and the rear panel 32. The pivot system 14 is coupled to each of the sidewalls 34 to enable the compartment 18 to pivot with respect to the housing 20.

The housing 20 is generally rectangular and includes a shell 50 and a pair of sidewalls 52. The shell 50 typically defines a cabin forward panel 51 and a rear panel 56. The cabin forward panel 51 is preferably not visible to passengers within the cabin 16 and is configured to enclose the aperture of the compartment 18 when the compartment 18 is in the closed position (FIG. 1). The cabin forward panel 51 can also include a portion of the latch system 19 to secure the compartment 18 in the closed position (not shown). The cabin forward panel 51 provides a mounting point for a ceiling panel as shown in FIG. 1. With reference to FIG. 2, the cabin forward panel 51 is coupled to or integrally formed with the rear panel 54. The sidewalls 52 of the housing 20 are coupled to or integrally formed with the cabin forward panel 50 and the rear panel 54. The pivot system 14 is coupled to the sidewall 52, typically adjacent to an end of the sidewall 52, to rotatably couple the compartment 18 to the housing 20.

The pivot system 14 is coupled to the sidewall 34 of the compartment 18 and the sidewall 52 of the housing 20. The pivot system 14 includes a first fitting 60 and a second fitting 62. The first fitting 60 is coupled to the sidewall 34 of the compartment 18, while the second fitting 62 is coupled to the sidewall 52 of the housing 20. Each of the first fitting 60 and the second fitting 62 include at least one opening 59 for receipt of a mechanical fastener to couple the first fitting 60 and the second fitting 62 to the sidewalls 34, 52, however, it will be understood that any suitable technique could be used to couple the first fitting 60 and the second fitting 62 to the sidewalls 34, 52, such as through bonding, adhesives, welding or combinations thereof.

With additional reference to FIGS. 2A and 2B, the first fitting 60 is rotatable within the second fitting 62 when assembled to enable the compartment 18 to rotate with respect to the housing 20 into an opened position (FIG. 5) and the closed position (FIG. 1). The first fitting 60 also secures the compartment 18 to the housing 20 via the second fitting 62, as will be discussed herein. Referring to FIGS. 2A and 2B, the first fitting 60 is annular, symmetric about an axis A and sized to be received entirely within the second fitting 62. Generally, the first fitting 60 can be composed of a polymeric material, such as a N66 nylon material, however, any suitable material could be employed that has a sufficient strength to support the rotation of the compartment 18. For example, a shear load strength of at least about 300 pounds is generally required for a 48-inch long compartment 18.

With reference to FIGS. 3A, 3B, 4A and 4B, the first fitting 60 includes a raceway 64 and a bearing surface 66 formed on a first surface 61, and an engagement feature 68 formed on a second surface 63. The first fitting 60 can also include a cut-out area 69 formed on the first surface 61. The cut-out area 69, if included, provides mass savings without impeding the strength or operation of the first fitting 60. The first surface 61 is generally configured to mate with the second fitting 62, while the second surface 63 is configured to mate with both the second fitting 62 and the sidewall 34, as will be discussed herein.

Figures 4A, 4B:
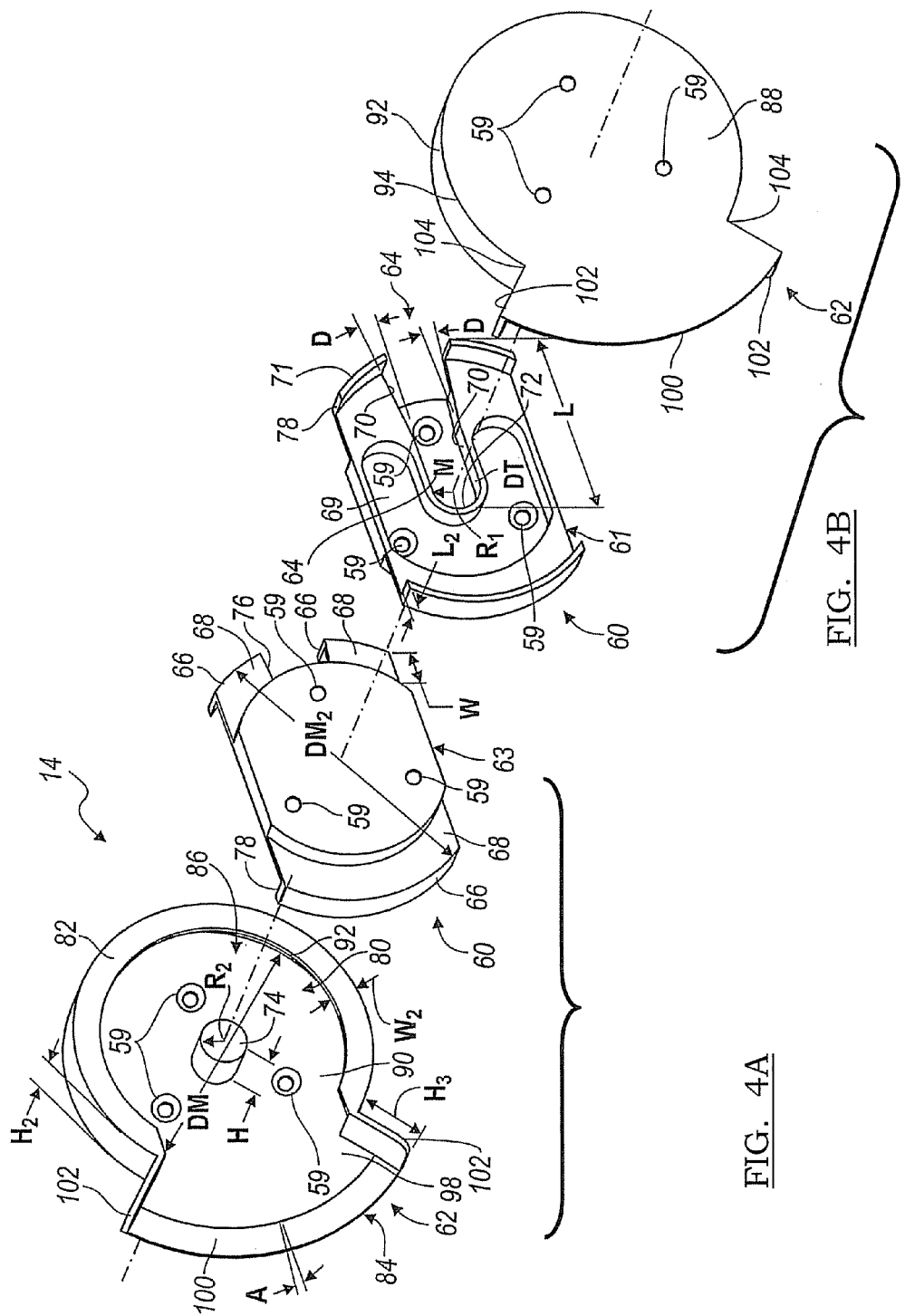
FIGS. 4a and 4b are exploded front and rear views, respectively, of the pivot system.

The raceway 64 is typically molded into the first surface 61 of the first fitting 60. The raceway 64 defines a channel for coupling the first fitting 60 to the second fitting 62. It should be noted that the raceway 64 could also be formed in a post-processing step, by machining for example. The raceway 64 can extend from an exterior edge 71 of the first fitting 60 to slightly past a midpoint M of the first fitting 60, and can have a length L and a depth $D_T$ (FIG. 4b). Generally, the length L and the depth $D_T$ of the raceway 64 are such that the first fitting 60 is received fully into the second fitting 62, as will be discussed herein.

Referring to FIG. 4a and 4b, the raceway 64 is generally U-shaped with opposing walls 70 and stop 72. The opposing walls 70 include a draft angle D to guide the first fitting 60 into engagement with the second fitting 62. The draft angle D also ensures that the first fitting 60 is properly coupled to the second fitting 62. The draft angle D ranges from about 0.5 degrees to 5 degrees, and can preferably be about 2.5 degrees. The stop 72 is formed with a radius $R_1$ that is approximately equivalent to a radius $R_2$ associated with a hub 74 of the second fitting 62. Thus, the stop 72 is formed such that the hub 74 is in tight engagement with the raceway 64 when the first fitting 60 is completely coupled to the second fitting 62.

The first fitting 60 also includes the bearing surface 66 that contacts the second fitting 62. The bearing surface 66 is typically molded into the first surface 61 of the first fitting 60, however, the bearing surface 66 could be formed on the first surface 61 during a post-processing step. The bearing surface 66 is arcuate, and forms an exterior projecting edge of the first surface 61 of the first fitting (FIGS. 4a and 4b). The bearing surface 66 projects a length $L_2$ above the first surface 61 to enable receipt of the hub 74 in the raceway 64. Thus, the length $L_2$ of the bearing surface 66 can be dependent upon the depth $D_T$ of the raceway 64 to ensure that the hub 74 can be properly received within the raceway 64 and that the first fitting 60 can rotate fully within the second fitting 62. Generally, the bearing surface 66 does not extend fully around the circumference of the first fitting 60, but rather, the bearing surface 66 defines an opening 76 to enable the hub 74 to pass into the raceway 64. The bearing surface 66 can also define openings 78. The openings 78 provide clearance between the first fitting 60 and the second fitting 62, and can also provide additional mass savings.

The engagement feature 68 is molded into the second surface 63 of the first fitting 60, however, the engagement feature 68 could be formed on the first surface 61 during a post-processing step. The engagement feature 68 mates with the second fitting 62 to couple the first fitting 60 to the second fitting 62, as will be discussed herein. The engagement feature 68 is preferably a groove or a step formed on the circumference of the second surface 63 of the first fitting 60, however, any suitable engagement feature could be employed. The engagement feature 68 is typically formed opposite the bearing surface 66, and can extend for a width W to enable engagement between the engagement feature 68 and the second fitting 62 (FIGS. 4a and 4b).

With continuing reference to FIGS. 2A, 2B, 3A, 3B and 4A and 4B, the second fitting 62 is coupled to the first fitting 60 to enable the compartment 18 to rotate with respect to the housing 20. The second fitting 62 is sized such that the entire first fitting 60 can rotate within the second fitting 62. The second fitting 62 is typically U-shaped and is symmetric about the axis A (FIG. 2A). Generally, the second fitting 62 can be composed of a metal or metal alloy material, such as an anodized aluminum material, for example, however, any suitable material could be employed. The second fitting 62 includes the hub 74, a bearing surface 80, a mating engagement feature or engagement feature 82 and a guide 84. The hub 74, bearing surface 80, engagement feature 82 and guide 84 are each cast into a first surface 86 of the second fitting 62, however, each of the hub 74, bearing surface 80, engagement feature 82 and guide 84 could be formed on the first surface 86 through any appropriate technique, such as machining. The first surface 86 is configured for receipt of the first fitting 60.

A second surface 88 of the second fitting 62 is configured to engage the sidewall 52 of the housing 20, and thus, is generally smooth.

The hub 74 of the second fitting 62 extends from the first surface 86 of the second fitting 62. The hub 74 has a height H that is less than a height $H_2$ of the engagement feature 82, as will be discussed (FIG. 4). The hub 74 is generally cylindrical in shape, however, the hub 74 could have any shape desired that corresponds to the raceway 64. If the raceway 64 is a U-shaped channel as illustrated, then the hub 74 is generally cylindrical. The hub 74 is generally sized such that as the hub 74 is gradually inserted into the raceway 64, the clearance between the walls 70 of the raceway 64 and the hub 74 decreases to guide the hub 74 into a proper alignment. Preferably, the radius $R_2$ of the hub 74 is approximately equivalent to the radius $R_1$ of the stop 72 of the raceway 64 to prevent side to side movement when the first fitting 60 is coupled to the second fitting 62.

The bearing surface 80 of the second fitting 62 comprises an annular portion 90 of the first surface 86 and includes a projecting rim 92. The annular portion 90 has a diameter $D_M$ that is slightly larger than a diameter $D_{M2}$ of the first fitting 60 to enable the first fitting 60 to rotate within the second fitting 62, and thus, to enable the bearing surface 66 of the first fitting 60 to contact the bearing surface 80 of the second fitting 62 (FIGS. 3B, 4A, and 4B). The rim 92 projects from an exterior edge 94 of the annular portion 90 for about 260 degrees to about 280 degrees to define an opening 98 for receipt of the first fitting 60, as will be discussed. The rim 92 also contacts bearing surface 66 of the first fitting 60. The rim 92 extends above the first surface 86 at a height that is equivalent to the height $H_2$ of the engagement feature 82. The height $H_2$ is such that the engagement feature 82 of the second fitting 62 contacts and engages the engagement feature 68 of the first fitting 60 when the first fitting 60 is assembled to the second fitting 62.

The engagement feature 82 of the second fitting 62 extends perpendicularly from the rim 92 and can form a lip for contacting the engagement feature 68 of the first fitting 60 when assembled. Typically, as shown in FIGS 4a and 4b the engagement feature 82 has a width $W_2$ that extends for a distance at least substantially equal to the width W of the engagement feature 68 of the first fitting 60. The engagement feature 82 preferably extends from the rim 92 along the entire circumference of the rim 92, however, the engagement feature 82 could extend for a shorter distance if desired. Thus, the engagement feature 82 generally borders the opening 98 for receipt of the first fitting 60.

The opening 98 can range from about 80 degrees to 100 degrees for receipt of the first fitting 60. The opening 98 and the guide 84 allow the first fitting 60 to be directed into engagement with the second fitting 62. The guide 84 is cast adjacent to the opening 98 and includes a ramp 100 and angled flanges 102. With reference to FIG. 3A, the ramp 100 has an angle A from about 0.01 degrees to 5.0 degrees to facilitate the engagement of the first fitting 60 and second fitting 62. The flanges 102 are each formed at corners 104 of the ramp 100 as shown in FIG. 4a and 4b. The flanges 102 each extend a height $H_3$ equivalent to the height $H_2$ of the rim 92. The flanges 102 each assist further in guiding the first fitting 60 into engagement with the second fitting 62 by enabling an operator assembling the compartment 18 to the housing 20 to position the compartment 18 into the proper position.

Generally, in order to assemble the first fitting 60 to the second fitting, after the first fitting 60 and second fitting 62 are each coupled to the sidewalls 34, 52, the compartment 18 can be aligned with the housing 20, as shown in FIG. 2. With the compartment 18 aligned with the housing 20, the first fitting 60 is also aligned to contact the guide 84 of the second fitting 62. If the compartment 18 is slightly misaligned, either of the flanges 102 and the ramp 100 can guide the compartment 18, via the first fitting 60, into its proper position with respect to the housing 20.

Figure 5:
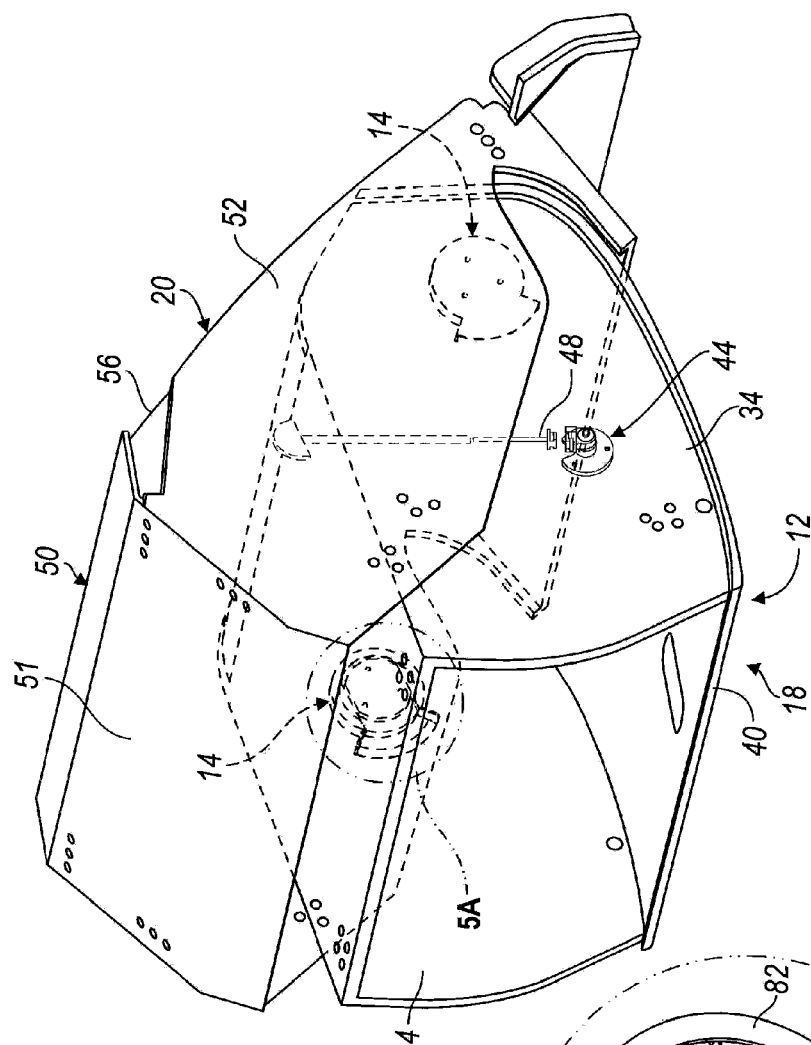
FIG. 5 is a perspective view of a second procedure for assembling the pivot system with the stowage compartment.
Figure 5A:
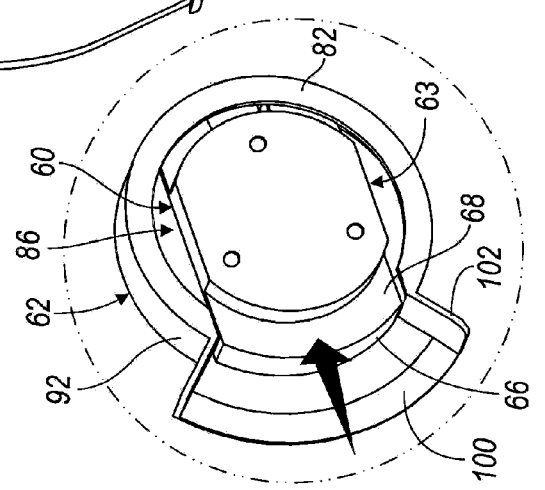
FIG. 5A is a detail view of the pivot system during the second procedure of FIG. 5.
Figures 6, 6A:
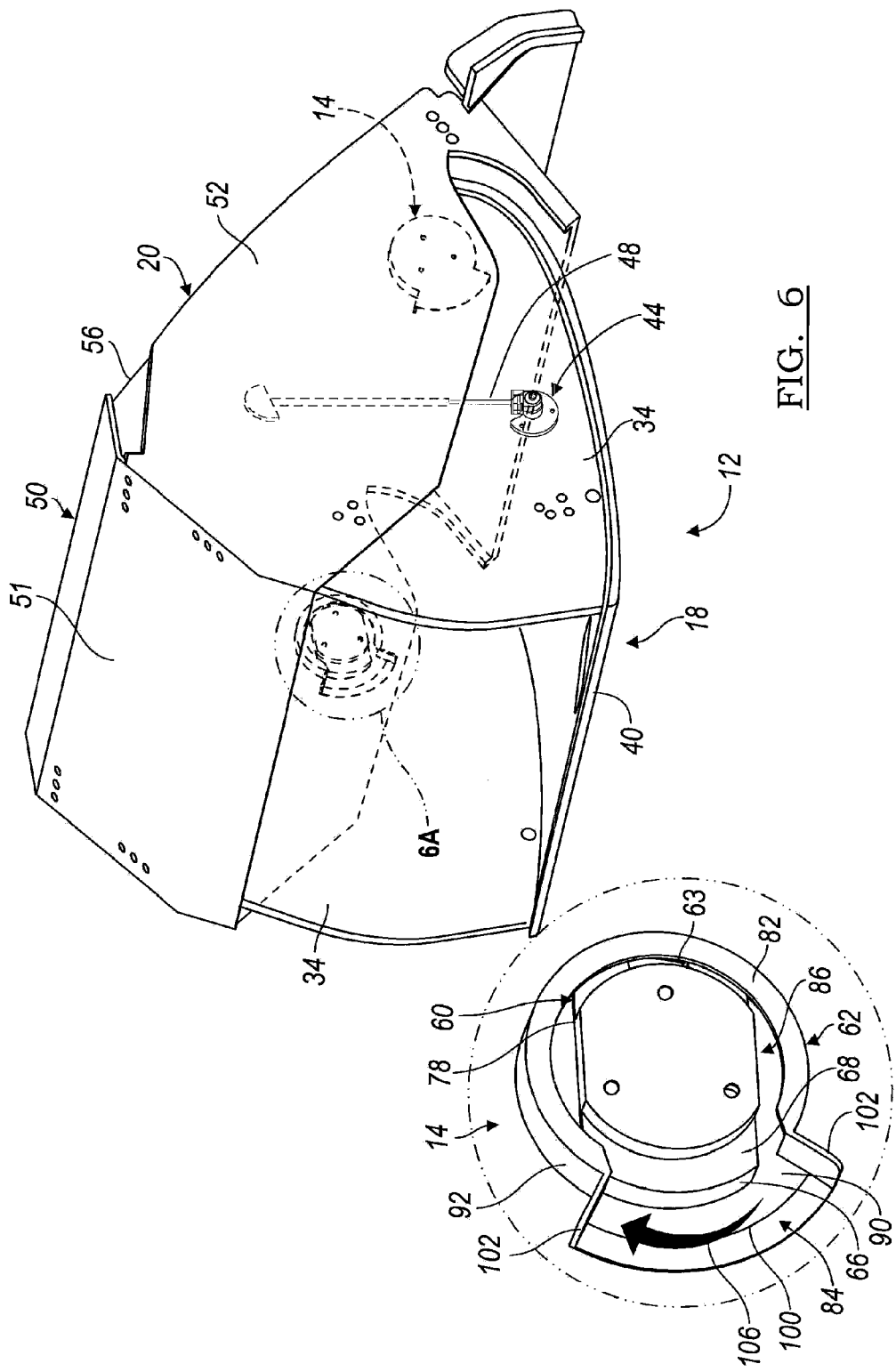
FIG. 6 is a perspective view of a third procedure for assembling the pivot system with the stowage compartment.
FIG. 6A is a detail view of the pivot system during the third procedure of FIG. 6.

With reference to FIG. 5, after the compartment 18 is aligned with the housing 20, the compartment 18 is slid into engagement with the housing 20. The compartment 18 is slid into engagement with the housing 20 by guiding the first fitting 60 into the opening 98 of the second fitting 62 to engage the raceway 64 with the hub 74 as shown in FIG. 5A. As the compartment 18 is pushed into the housing 20, the hub 74 slides in the raceway 64, guided by the draft angle D, until the hub 74 is engaged with the stop 72. Next, as shown in FIGS. 6 and 6A, the compartment 18 is rotated about 5 to 15 degrees such that the engagement feature 68 of the first fitting 60 contacts the engagement feature 82 of the second fitting 62 to couple the first fitting 60 to the second fitting 62, as indicated by the arrow 106. For example, for a compartment 18 having a load rating of 300 pounds, the compartment 18 can be rotated 10 degrees to ensure that the compartment 18 is secured to the housing 20. After the compartment 18 is rotated, the dampers 48 are attached to the attachment brackets 44 of the compartment 18 to further retain the compartment 18 in the housing 20. With the compartment 18 open and the dampers 48 attached, the compartment 18 is in the full opened position.

Figure 7:
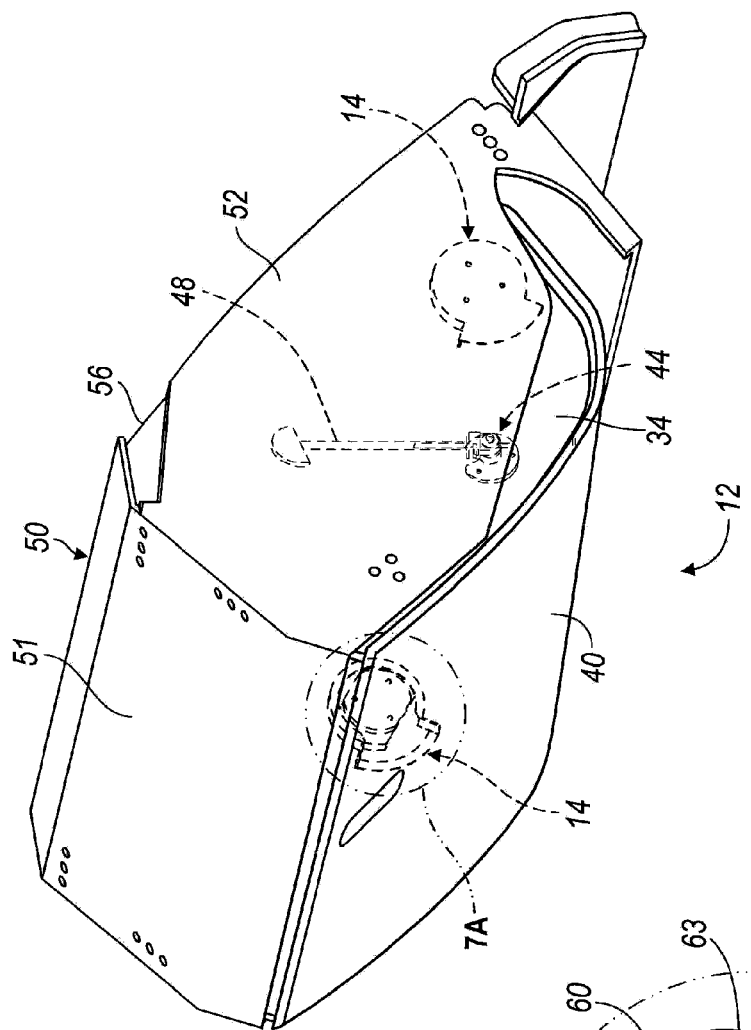
FIG. 7 is a perspective view of a fourth procedure for assembling the pivot system with the stowage compartment.
Figure 7A:
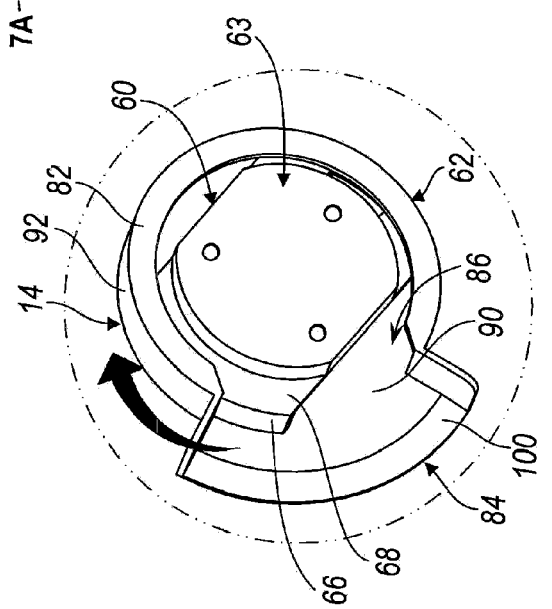
FIG. 7A is a detail view of the pivot system during the fourth procedure of FIG. 7.

Then, with reference to FIG. 7, the compartment 18 can be rotated from the full opened position to the closed and latched position. When the compartment 18 is rotated towards the closed position, with reference to FIG. 7A, the first fitting 60 pivots about the hub 74 and the bearing surface 66 of the first fitting 60 can contact the bearing surface 80 of the second fitting 62. At the closed position, the compartment 18 engages the latch system 19 to secure the compartment 18 to the housing 20 in the closed position (not shown).

Thus, the pivot system 14 of the present disclosure provides a two-piece pivot system 14 that enables an operator to quickly and easily install a rotatable stowage compartment 18 to the mobile platform 10 without the use of tools. The use of the two-piece pivot system 14 can also reduce the mass of the compartment system(s) 12. Furthermore, the bearing surface 80 of the second fitting 62 provides a large bearing area for the transfer of loads between the compartment 18 and the housing 20, and can improve the longevity of the compartment 18, housing 20 and pivot system 14.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be strictly limited to the particular examples illustrated by the drawings and described in the specification, but that the scope of the present disclosure will include any embodiments falling within the foregoing description and the appended claims.

What is claimed is:

1. An overhead stowage bin pivot system for assisting in controlling opening and closing movement of an overhead stowage compartment on a mobile platform, the pivot system having a first and a second pivot member, the first pivot member comprising:
   a first structure including a first fitting coupled to a compartment;
   a second structure including a second fitting coupled to a housing;
   the first fitting comprising:
   an engagement feature formed by a pair of parallel planar walls extending from a pair of opposing curved walls and a generally U-shaped raceway, the curved walls forming a bearing surface, the pair of parallel planar walls separated by a first dimension,
   the raceway extending into the first fitting from one of the curved walls with opposing walls and a circumferential stop, the opposing walls including a draft angle to facilitate insertion of the first fitting into the second fitting,
   the second fitting comprising:
   a housing having a substantially flat bearing surface and a circumferential wall extending therefrom over an arc of between about 260 degrees to about 280 degrees about the bearing surface defining an opening having a second dimension being a linear distance across the opening that is substantially similar to, but larger than the first dimension,
   a lip extending transversely from the circumferential wall of the second fitting over an arc of about 260 degrees to about 280 degrees for axially retaining the first fitting within the second fitting;
   a central, inflexible hub having an upright circumferential post extending from the bearing surface that engages the circumferential stop portion of the raceway when the first fitting is fully inserted into the second fitting; and
   wherein the first fitting is rotatable within the circumferential wall of the second fitting only after being fully inserted through the opening and is prevented from being removed from the second fitting unless the opening and the engagement feature are in proper alignment.

2. The pivot system of claim 1, wherein the draft angle of the raceway extends only partially along the raceway, to ensure tight engagement between the raceway and the hub.

3. The pivot system of claim 1, further comprising a guide defined on the substantially flat bearing surface of the second fitting, the guide including at least one angled flange to direct the first fitting into the second fitting.

4. The pivot system of claim 1, wherein the first fitting is formed of a polymeric material.

5. The pivot system of claim 1, wherein the second fitting is formed of a metal or metal alloy.

6. The system of claim 1, wherein the circumferential wall of the second fitting forms an arcuate bearing surface.

7. The system of claim 1, further comprising a plurality of holes formed in the first fitting for enabling the first fitting to be secured to the first structure.

8. The system of claim 1, further comprising a plurality of holes formed in the second fitting for enabling the second fitting to be secured to the second structure.

9. The system of claim 1, wherein the second pivot member comprises:
   a first structure including a first fitting coupled to a compartment;

a second structure including a second fitting coupled to a housing;

the first fitting comprising:

an engagement feature formed by a pair of parallel planar walls extending from a pair of opposing curved walls and a generally U-shaped raceway, the curved walls forming a bearing surface, the pair of parallel planar walls separated by a first dimension, the raceway extending into the first fitting from one of the curved walls with opposing walls and a circumferential stop, the opposing walls including a draft angle to facilitate insertion of the first fitting into the second fitting, the second fitting comprising:

a housing having a substantially flat bearing surface and a circumferential wall extending therefrom over an arc of between about 260 degrees to about 280 degrees about the bearing surface defining an opening having a second dimension being a linear distance across the opening that is substantially similar to, but larger than the first dimension, a lip extending transversely from the circumferential wall of the second fitting over an arc of about 260 degrees to about 280 degrees for axially retaining the first fitting within the second fitting;

a central, inflexible hub having an upright circumferential post extending from the bearing surface that engages the circumferential stop portion of the raceway when the first fitting is fully inserted into the second fitting; and wherein the first fitting is rotatable within the circumferential wall of the second fitting only after being fully inserted through the opening and is prevented from being removed from the second fitting unless the opening and the engagement feature are in proper alignment with one another.

10. An overhead stowage bin pivot system for facilitating movement of a moveable compartment relative to a fixedly supported housing on a mobile platform, the pivot system having a first and a second pivot member, the first pivot member comprising:

a first structure including a first fitting secured thereto, and adapted to be coupled to the moveable compartment;

a second structure including a second fitting secured thereto, and adapted to be coupled to the housing;

the first fitting comprising:

an engagement feature formed by a pair of parallel planar walls extending from a pair of opposing curved walls and a generally U-shaped raceway, the curved walls forming a bearing surface, the pair of parallel planar walls separated by a first dimension, the raceway extending into the first fitting from one of the curved walls with opposing walls and a circumferential stop, the opposing walls including a draft angle to facilitate insertion of the first fitting into the second fitting, the second fitting comprising:

a housing having a substantially flat bearing surface and a circumferential wall extending therefrom over an arc of between about 260 degrees to about 280 degrees about the bearing surface defining an opening having a second dimension being a linear distance across the opening that is substantially similar to, but larger than the first dimension, a lip extending transversely from the circumferential wall of the second fitting over an arc of about 260 degrees to about 280 degrees for axially retaining the first fitting within the second fitting;

a central, inflexible hub having an upright circumferential post extending from the bearing surface that engages the circumferential stop portion of the raceway when the first fitting is fully inserted into the second fitting; and wherein the first fitting is rotatable within the circumferential wall of the second fitting only after being fully inserted through the opening and is prevented from being removed from the second fitting unless the opening and the engagement feature are in proper alignment with one another.

* * * * *